C. NEAMES.
Improvement in Pipe Wrenches.
No. 122,638.
Patented Jan. 9, 1872.
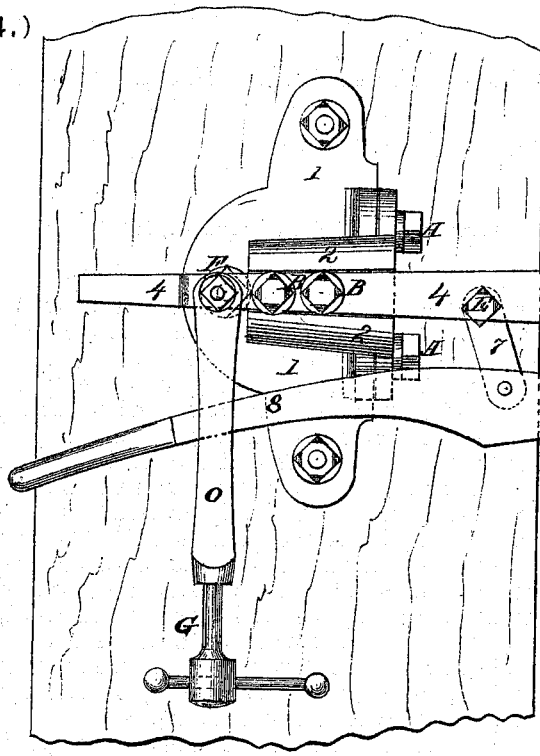
Fig. 1.
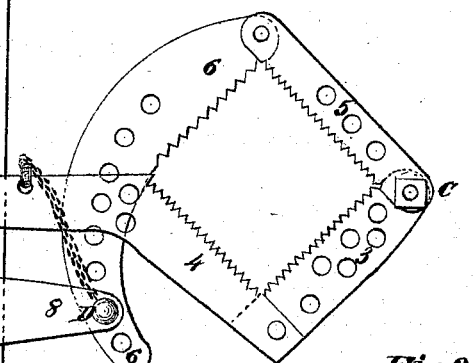
Fig. 2.
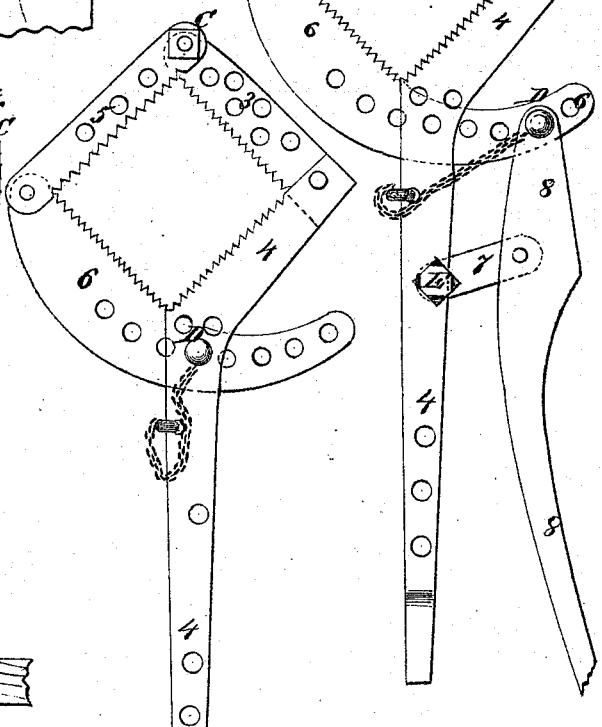
Fig. 3.
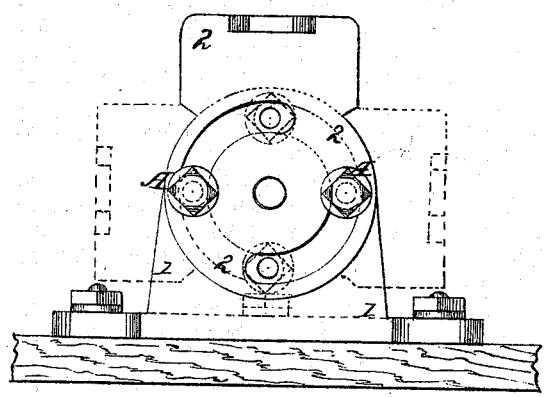
Fig. 4.
Fig. 5.
Witnesses:
P. C. Dieterich.
Francis McArdle
Inventor:
Charles Neames
per
Attorneys.

122,638

UNITED STATES PATENT OFFICE.

CHARLES NEAMES, OF NEW ORLEANS, LOUISIANA.

IMPROVEMENT IN PIPE-WRENCHES.

Specification forming part of Letters Patent No. 122,638, dated January 9, 1872.

Specification describing a certain Improvement in Combined Gas-Pipe Wrench, Gas-Pipe Vise, and Square Wrench, invented by CHARLES NEAMES, of New Orleans, in the parish of Orleans and State of Louisiana.

Figure 1 is a top view of my improved tool attached to a stand. Fig. 2 is a top view of the same detached from the stand. Fig. 3 is a top view of the same with the lever attached. Fig. 4 is an edge view of the same. Fig. 5 is a detail front view of the stand.

My invention has for its object to furnish an improved tool, which shall be so constructed as to adapt it for use as a gas-pipe wrench, a gas-pipe vise, and a square wrench for large bolts, and which shall be simple in construction, inexpensive in manufacture, and effective in use in either capacity; and it consists in the construction and combination of the various parts of the tool, as hereinafter more fully described.

1 represents the stand, which is securely bolted to the work-bench. 2 is a bracket, which is secured to the stand by two bolts, A, which pass through curved slots in the vertical plate of the bracket 2 and through holes in the vertical plate of the stand 1. Four holes are formed in the stand 1 to receive the bolts A, as shown in Fig. 5, so that by placing said bolts in the side holes, or in the top and bottom holes, the tool may be inclined as may be desired. In the top plate of the bracket 2 is formed a groove to receive a rib formed upon the under side of the bar or stock 4, which bar 4 is secured to said bracket 2 by two bolts, B, as shown in Fig. 1. Upon the inclined forward end of the bar 4 are formed teeth, as shown in Figs. 1, 2, and 3. 3 is a bar, one end of which is pivoted or rigidly attached to the end of the bar 4, and the other end of which is pivoted to and between the ends of the two parallel bars 5 by a bolt, C, several holes being formed in the said bars 3 5 to receive the said bolt, so that they may be adjusted as required. To and between the other ends of the bars 5 are pivoted the end of the curved bar 6, the other end of which passes through a slot in the bar 4, and has several holes formed in it to receive the pin D, by which the end of the lever 8 is adjustably pivoted to the said bar 6. Upon the inner edges of the bars 3 5 6, which serve as the jaws of the wrench and vise, are formed teeth to cause them to take a firmer hold upon the pipe or bolt to be turned or held. The forward end of the lever 8 is slotted to receive the bar 6 and to receive the end of the short bar 7, to which it is pivoted, and which serves as its fulcrum. The other end of the short bar 7 enters the slot in the bar 4, and is detachably pivoted to said bar by a bolt, E, as shown in Fig. 1. The lever 8 passes back through the slot of the slotted bar or clevis, O, which is detachably secured to the bar 8 by a bolt, F, as shown in Fig. 1, and which has a vise-screw, G, connected with its outer end, as shown in Fig. 1, the inner end of which, when turned inward, presses against the outer edge of the lever 8.

The tool, arranged as shown in Fig. 1, is designed for use as a vise for holding gas-pipe while cutting screw-threads upon it, and when thus used it can be adjusted for holding pipe of various sizes.

By taking off the clevis or slotted bar O and its attached screw G, and removing the two bolts B, the tool can be used as a gas-pipe wrench for screwing and unscrewing gas-pipe, and may be adjusted to various-sized pipes.

By shifting the bolt C and the pin D the tool becomes a good gas-pipe wrench, and the harder you pull upon it the firmer it will grasp the pipe, bearing upon the four sides of the pipe equally, the vibrating fulcrum 7 always throwing the toothed bar 6 forward against the pipe to be grasped.

By removing bolt E, and thus detaching the lever 8, and then placing the pin D in the holes in the bar 6 and in the forward part of the bar 4, the tool becomes a very strong square wrench for large nuts and bolts.

The outer or free ends of the bar 4 and lever 8 may be made of the same size, and so formed as to fit into the same gas-pipe handle, which may thus be shifted from the one to the other of said posts, as occasion may require.

By making the handle of a piece of gas-pipe it is lighter and more easily made, and at the same time sufficiently strong.

Having thus described my invention, I claim as new and desire to secure by Letters Patent—

1. The combination of the bars 4, 3, 5, and 6 and pin D with each other, substantially as herein shown and described, and for the purpose set forth.

2. The combination of the bars 4, 3, 5, and 6, lever 8, pivoted fulcrum-bar 7, and pin D with each other, substantially as herein shown and described, and for the purpose set forth.

3. The combination of the bars 4, 3, 5, and 6, pin D, lever 8, fulcrum-bar 7, slotted bar or clevis O, screw G, adjustable bracket or standard 2, and stand or foot 1 with each other, substantially as herein shown and described, and for the purpose set forth.

CHARLES NEAMES.

Witnesses:
TH. BUISSON,
JAMES MACKISAN. (100)